US012562080B2

(12) United States Patent
Zhang et al.

(10) Patent No.: US 12,562,080 B2
(45) Date of Patent: Feb. 24, 2026

(54) MODEL BOX FOR LEAKAGE AND COLLAPSE OF BURIED PIPELINE CAPABLE OF SWITCHING INTERNAL AND EXTERNAL SEEPAGE WORKING CONDITIONS

(71) Applicant: NANJING CENTER, CHINA GEOLOGICAL SURVEY (EAST CHINA CENTER FOR GEOSCIENCE INNOVATION), Nanjing (CN)

(72) Inventors: Qing Zhang, Nanjing (CN); Yunfeng Li, Nanjing (CN); Weiya Ge, Nanjing (CN); Zongfang Chen, Nanjing (CN); Jian Hua, Nanjing (CN); Yuanzhi Lu, Nanjing (CN); Lili Hou, Nanjing (CN); Jingjing Du, Nanjing (CN)

(73) Assignee: NANJING CENTER, CHINA GEOLOGICAL SURVEY (EAST CHINA CENTER FOR GEOSCIENCE INNOVATION), Nanjing (CN)

( * ) Notice: Subject to any disclaimer, the term of this patent is extended or adjusted under 35 U.S.C. 154(b) by 429 days.

(21) Appl. No.: 18/469,580

(22) Filed: Sep. 19, 2023

(65) Prior Publication Data

US 2024/0062682 A1 Feb. 22, 2024

(30) Foreign Application Priority Data

Jan. 16, 2023 (CN) .......................... 202310061794.1

(51) Int. Cl.
G09B 25/02 (2006.01)
G09B 25/00 (2006.01)

(52) U.S. Cl.
CPC ............. *G09B 25/02* (2013.01); *G09B 25/00* (2013.01)

(58) Field of Classification Search
CPC .......... G09B 25/02; G09B 25/00; Y02E 10/20
See application file for complete search history.

(56) References Cited

U.S. PATENT DOCUMENTS

2021/0123841 A1    4/2021  Hu et al.
2023/0284413 A1*   9/2023  Zhu .................... H05K 7/20154
                                                            361/679.46

FOREIGN PATENT DOCUMENTS

CN        104330533 A      2/2015
CN        106018736 A      10/2016
          (Continued)

OTHER PUBLICATIONS

Tao Gaoliang , Li Jin , Zhuang Xinshan , Cui Xilin , Hu Qizhi; Seepage Failure Experiment of Sandy Soil Caused by Leakage of Underground Water Pipe Journal of Water Resources and Architectural Engineering, No. 1, 1-7 Publication date: Feb. 15, 2018.

*Primary Examiner* — Eddy Saint-Vil
(74) *Attorney, Agent, or Firm* — CBM PATENT CONSULTING, LLC

(57) ABSTRACT

A model box for leakage and collapse of a buried pipeline capable of switching internal and external seepage working conditions includes a steel structure box body, an organic glass observation window, a stainless steel pipeline, an organic glass pipeline and a sand discharging pipeline; a top portion of the box body is opened and provided with a rainfall structure bracket; two sides of an interior of the box body are divided into water tanks on two sides and a sand tank in a middle portion through steel plate barriers, and the steel plate barrier is provided with a water permeable hole.

7 Claims, 5 Drawing Sheets

(56)         References Cited

FOREIGN PATENT DOCUMENTS

| CN | 110221042 | A | 9/2019 | |
| CN | 115078109 | A | 9/2022 | |
| DE | 102005058100 | B3 * | 8/2007 | ........... F03B 13/187 |
| KR | 20200041105 | A | 4/2020 | |

* cited by examiner

25 —

— 26
— 27

MODEL BOX FOR LEAKAGE AND COLLAPSE OF BURIED PIPELINE CAPABLE OF SWITCHING INTERNAL AND EXTERNAL SEEPAGE WORKING CONDITIONS

CROSS-REFERENCE TO RELATED APPLICATIONS

This application claims priority to Chinese Patent Application Ser. No. CN202310061794.1 filed on 16 Jan. 2023.

TECHNICAL FIELD

The present invention belongs to the technical field of buried pipeline leakage, and is particularly to a model box for leakage and collapse of a buried pipeline capable of switching internal and external seepage working conditions.

BACKGROUND

Water supply and drainage pipelines buried underground are an important guarantee for the effective operation of city, are likened to lifelines of city, and ensure the normal operation of city. However, due to various reasons, such as corrosion of surrounding soil, external traffic load, improper mounting of pipelines and aging of pipelines, a huge underground pipeline network may eventually have a damaged opening, and leakage and explosion accidents of the pipeline network may occur frequently, resulting in huge economic losses and safety accidents. A model box for leakage and collapse of a buried pipeline is used to simulate a breaking and collapse process of an urban underground pipeline, and clearly and completely displays this process, which is convenient for detailed study on it and is of great significance to protect people's personal safety and reduce property losses.

Existing model boxes for leakage and collapse of the buried pipeline are all made of organic glass, and various pieces of organic glass are connected by a glass cement. Limited by a bearing capacity of the organic glass, the model box usually has a small overall size, with a large size effect, and an external interference is amplified during an experiment, resulting in a large error. In addition, the model box can only be experimented in one of two working conditions of internal and external seepage. At present, it is generally considered that there are two main working conditions in a collapse process and a pipeline leakage process caused by leakage of the buried pipeline, which are namely internal seepage and external seepage. In fact, the two working conditions occur at the same time, so that it is of practical research significance only if the two working conditions occur at the same time in a model experiment.

SUMMARY

Object of invention: the technical problem to be solved by the present invention is to provide a model box for leakage and collapse of a buried pipeline capable of switching internal and external seepage working conditions aiming at the defects in the prior art, so as to solve the problems of too small size, too obvious size effect, implementation of only single working condition and poor simulation value of an existing model box for leakage and collapse of a buried pipeline.

In order to achieve the above object, a technical solution adopted in the present invention is as follows.

A model box for leakage and collapse of a buried pipeline capable of switching internal and external seepage working conditions comprises a steel structure box body, an organic glass observation window, a stainless steel pipeline, an organic glass pipeline and a sand discharging pipeline, wherein, a top portion of the box body is opened and provided with a rainfall structure bracket; and two sides of an interior of the box body are divided into water tanks on two sides and a sand tank in a middle portion through steel plate barriers, and the steel plate barrier is provided with a water permeable hole;

the organic glass observation windows are arranged on two sides of long edges of the box body; the stainless steel pipeline and the organic glass pipeline are respectively mounted on inner sides of the organic glass observation windows on two sides, and located in the sand tank; and the stainless steel pipeline and the organic glass pipeline are respectively reserved with a threaded drilling hole for simulating pipeline seepage; and a pair of sand discharging pipelines are provided and respectively arranged at bottom portions of two sides of long edges of the box body, and when being used for simulating the external seepage working condition, the sand discharging pipeline is used as a bottom water drainage and sand discharge port to drain water and discharge sand so as to form the collapse, and used as an outlet to finally discharge internal sand after an experiment is ended at the same time.

Further, the model box for leakage and collapse of the buried pipeline capable of switching internal and external seepage working conditions further comprises a water tank water level control system, wherein the water tank water level control systems are arranged on the water tanks on two sides of short edges of the box body, and the water tank water level control system comprises a drainage drilling hole, a side surface slide rail, a profile steel clamping seat and a hose; the drainage drilling hole is arranged at a bottom portion of an outer wall of the water tank; the side surface slide rail is longitudinally arranged on the outer wall of the water tank; the profile steel clamping seat is slidably mounted on the side surface slide rail and capable of sliding up and down along the side surface slide rail to adjust a height; and one end of the hose is connected to the drainage drilling hole, and the other end of the hose is fixed on the profile steel clamping seat. A principle of a communication device is used to control a water level in the water tank.

Specifically, the stainless steel pipeline is arranged on an inner side of the organic glass observation window through a steel structure pipeline support frame; a set of pipeline support frames are provided, all have an inverted T-shaped structure, and are respectively attached to an inner wall of the organic glass observation window by sticking a waterproof tape; the stainless steel pipeline is fixed on the box body at positions close to an inlet and an outlet of the sand box through clamping hoops, and the pipeline support frame is closely attached to the organic glass observation window; and a set of stainless steel pipeline threaded drilling holes with different sizes and directions are reserved in the stainless steel pipeline and sealed by corresponding bolts. In a simulation experiment, the pipeline seepage is simulated by opening a corresponding threaded drilling hole.

Specifically, the organic glass pipeline is fixed on an inner side of the organic glass observation window through a concave organic glass structural member; a notch of the organic glass structural member is inward, and a face portion of the organic glass structural member is attached to the inner wall of the organic glass observation window through a glass cement; the organic glass pipeline is fixed in the organic glass structural member through AB glue, connected with external pipelines at positions close to an inlet and an outlet of the sand box through gold wire hoses, and fixed in the interior of the box body at the wire gold hoses through clamping hoops, so that the organic glass structural member is closely attached to the organic glass observation window; and a set of organic glass pipeline threaded holes with different sizes and directions are reserved in the organic glass pipeline, and sealed by corresponding bolts. Similarly, in the simulation experiment, the pipeline seepage is simulated by opening a corresponding threaded drilling hole.

Specifically, the steel structure box body is formed by welding a box body external profile steel frame, a multi-layer profile steel frame plate, a bottom steel frame and a stainless steel bottom plate with each other; the box body external profile steel frame and the bottom steel frame are fixed by welding to form a box body frame; the multi-layer profile steel frame plates are enclosed to form peripheral side surfaces of the box body; and the stainless steel bottom plate is welded on the bottom steel frame to form a bottom surface of the box body.

Further, peripheral side surfaces of the steel structure box body are welded with box body fixing brackets, and the box body fixing brackets are fixed on a cement platform through expansion screws.

Preferably, the organic glass observation windows are mounted on two sides of long edges of the box body through glass pressing assemblies; the glass pressing assembly is connected to the box body external profile steel frame through a bolt, and a waterproof tape is stuck between the organic glass observation window and the glass pressing assembly; and the organic glass observation windows on two sides of the box body are painted with 1 cm×1 cm grids.

Specifically, the rainfall structure bracket comprises a top slide rail and a rainfall bracket; the top slide rails are mounted on two sides of a top portion of the box body through bolts, and two ends of the rainfall bracket are movably mounted on the top slide rails and capable of sliding back and forth along the top slide rails; and an upper portion of the rainfall bracket is provided with a set of perforated nylon pipelines, the perforated nylon pipelines are connected with an external water pump through corresponding water pipes, and water is conveyed into the perforated nylon pipelines through the water pump to simulate rainfall.

Specifically, the sand discharging pipelines are fixed at bottom portions of two sides of long edges of the box body by inserting fixing bolts through mounting steel plates; and an upper portion of the sand discharging pipeline is welded with an inclined sand washing pipe, a pipe orifice of the sand discharging pipeline uses a gate valve as a control switch, and a sand discharging and water guiding tank is assembled below the sand discharging pipeline.

Further, the steel plate barriers between the water tanks on two sides and the sand tank in the middle portion are provided with the water permeable holes, and the water permeable hole is filled with a water permeable stone; and a water tank organic glass plate is mounted on an outer wall steel plate of the water tank.

Beneficial Effects:
(1) According to the present invention, the stainless steel profile steel frame is used to form an integral box body structure, and the glass plates are used as the observation windows on two sides of the steel frame, with a high rigidity in structural form, thus being convenient for observing an internal change and being suitable for the model box for leakage and collapse of the buried pipeline for large-scale simulation.

(2) According to the present invention, the organic glass pipeline and the stainless steel pipeline are used to observe a leakage condition and simulate an actual situation respectively, and by adjusting a flow rate when the two pipelines are injected with water at the same time and controlling the threaded holes in the pipelines, separate internal seepage working condition and external seepage working condition may be switched, and the two working conditions may occur simultaneously, thus being in line with an actual situation and having a practical research value.

(3) According to the present invention, a water head height in sand during the experiment may be controlled at will through the water level control system assembled on the box body. The steel plate barriers are arranged between the water tanks and the sand tank in the interior of the box body, the steel plate barrier is provided with the water permeable hole, and the water permeable hole is filled with the water permeable stone, thus realizing water level communication in the water tanks and the sand tank. The slidable slide rail is designed outside the water tank, one slidable profile steel clamping seat is mounted on the slide rail, the drainage drilling hole is arranged at the bottom portion of the outer side of the water tank, one end of the hose is fixed at the drainage drilling hole, and the other end of the hose is fixed on the profile steel clamping seat, so that a height position of the profile steel clamping seat on the slide rail is adjusted, and then the water level in the water tank is controlled according to the principle of the communication device.

(4) According to the present invention, the top portion of the model box is a combination of an H-shaped steel frame and a slide rail mechanism, thus realizing rainfall by placing the perforated nylon pipeline on the steel frame. The top portion of the model box is provided with the rainfall structure bracket, the rainfall structure bracket is connected with the external profile steel frame through the bolt on the slide rail, the rainfall bracket on the rainfall structure bracket may be disassembled, and the rainfall may be realized by winding the perforated nylon pipeline on the rainfall bracket, and meanwhile, a rainfall position may be adjusted through the movement of the rainfall bracket on the slide rail.

(5) According to the present invention, it is unnecessary to disassemble the box body of the model box and models in the model box, and different working conditions for simulation may be switched, thus saving a lot of experiment time.

BRIEF DESCRIPTION OF THE DRAWINGS

The present invention is further described in detail hereinafter with reference to the drawings and specific embodiments, and the advantages of the above and/or other aspects of the present invention will be clearer.

Figure 1:
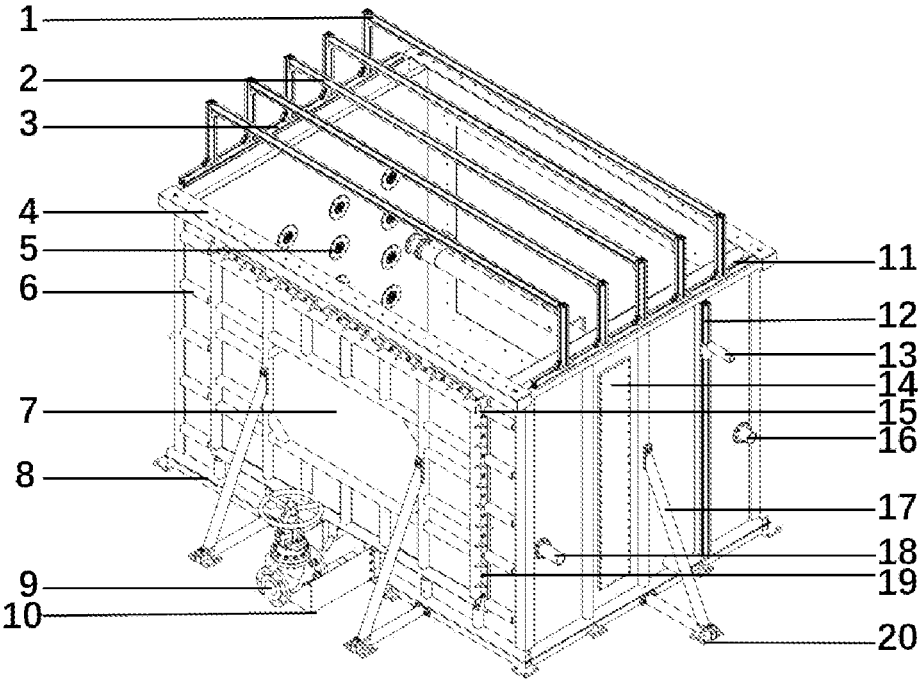
FIG. 1 is a schematic diagram of a stereoscopic structure of a model box.
Figure 2:
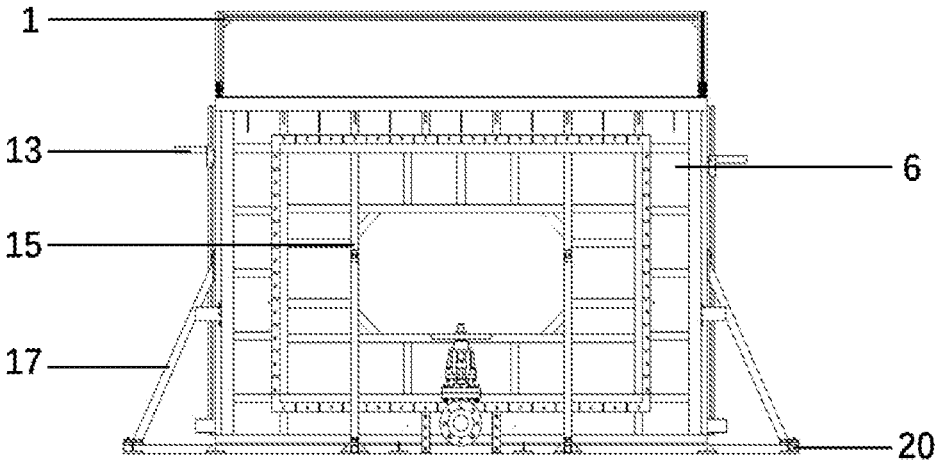
FIG. 2 is a front view of the model box.

Various reference numerals are respectively represented as follows:

1 refers to rainfall structure bracket; 2 refers to rainfall bracket; 3 refers to top slide rail; 4 refers to box body external profile steel frame; 5 refers to water permeable stone; 6 refers to multi-layer profile steel frame plate; 7 refers to organic glass observation window; 8 refers to bottom steel frame; 9 refers to sand discharging pipeline; 10 refers to sand discharging and water guiding tank; 11 refers to water tank water level control system; 12 refers to side surface slide rail; 13 refers to profile steel clamping seat; 14 refers to water tank organic glass plate; 15 refers to glass pressing assembly; 16 refers to stainless steel pipeline; 17 refers to box body fixing bracket; 18 refers to organic glass pipeline; 19 refers to bolt; 20 refers to expansion screw; 21 refers to stainless steel pipeline thread drilling hole; 22 refers to pipeline support frame; 23 refers to organic glass structural member; 24 refers to organic glass pipeline thread drilling hole; 25 refers to gate valve; 26 refers to mounting steel plate; 27 refers to inclined sand washing pipe; 28 refers to clamping hoop; 29 refers to drainage drilling hole; 30 refers to gold wire hose; and 31 refers to stainless steel bottom plate.

DETAILED DESCRIPTION

The present invention may be better understood according to the following embodiments.

With reference to FIG. 1 to FIG. 4, a model box for leakage and collapse of a buried pipeline capable of switching internal and external seepage working conditions of the present invention comprises a steel structure box body, an organic glass observation window 7, a stainless steel pipeline 16, an organic glass pipeline 18 and a sand discharging pipeline 9.

A top portion of the box body is opened and provided with a rainfall structure bracket 1; and two sides of an interior of the box body are divided into water tanks on two sides and a sand tank in a middle portion through steel plate barriers, and the steel plate barrier is provided with a water permeable hole. The whole box body has a length of 3 m, the water tanks respectively arranged on two sides of the box body have a width of 20 cm, and the sand box in the middle portion has a length of about 2.5 m.

The organic glass observation windows 7 are arranged on two sides of long edges of the box body; the stainless steel pipeline 16 and the organic glass pipeline 18 are respectively mounted on inner sides of the organic glass observation windows 7 on two sides, and located in the sand tank; and the stainless steel pipeline 16 and the organic glass pipeline 18 are respectively reserved with a threaded drilling hole for simulating pipeline seepage. The organic glass pipeline 18 is convenient for observing an internal flowing condition, and the stainless steel pipeline 16 is mainly used for simulating an actual working condition.

A pair of sand discharging pipelines 9 are provided and respectively arranged at bottom portions of two sides of long edges of the box body, and when being used for simulating the external seepage working condition, the sand discharg-ing pipeline is used as a bottom water drainage and sand discharge port to drain water and discharge sand so as to form the collapse, and used as an outlet to finally discharge internal sand after an experiment is ended at the same time.

In an existing model box for leakage and collapse of a pipeline, the water level is usually well controlled in the model box before the experiment first, and the water level is not controlled in a subsequent experiment process, which is changed with an experiment process. However, in an actual process of leakage and collapse of the buried pipeline, the surrounding water level may be automatically replenished with the decrease of the water level at the collapse position, thus keeping the water level unchanged. Therefore, the model box of the present invention is also provided with a water tank water level control system 11. With reference to FIG. 1, the water tank water level control systems 11 are arranged on the water tanks on two sides of short edges of the box body, and the water tank water level control system comprises a drainage drilling hole 29, a side surface slide rail 12, a profile steel clamping seat 13 and a hose; the drainage drilling hole 29 is arranged at a bottom portion of an outer wall of the water tank; the side surface slide rail 12 is longitudinally arranged on the outer wall of the water tank; the profile steel clamping seat 13 is slidably mounted on the side surface slide rail 12 and capable of sliding up and down along the side surface slide rail 12 to adjust a height; and one end of the hose is connected to the drainage drilling hole 29, and the other end of the hose is fixed on the profile steel clamping seat 13.

Figure 4:
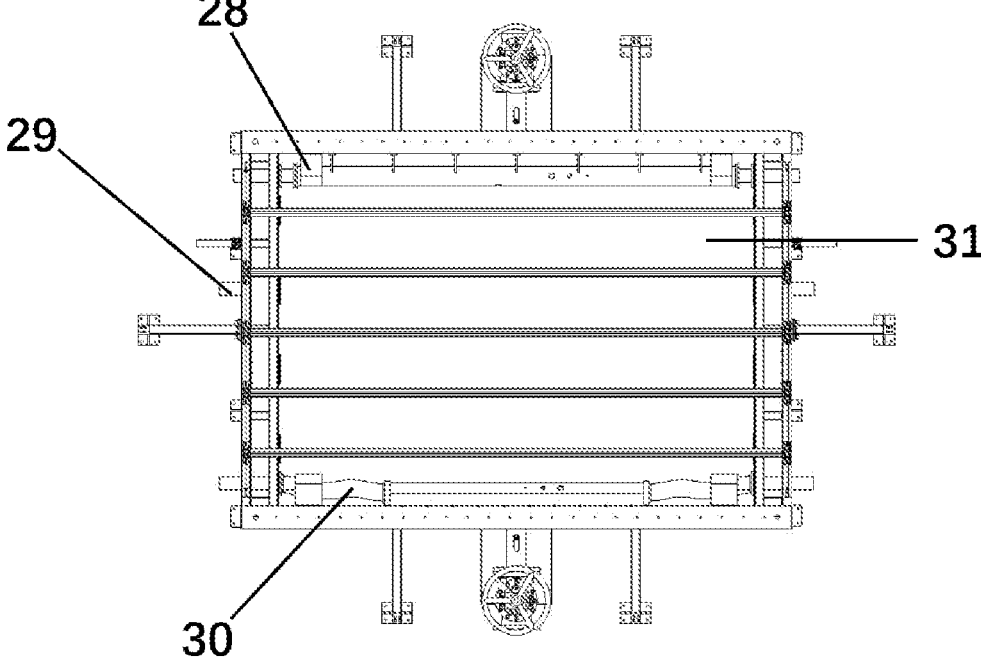
FIG. 4 is a top view of the model box.
Figure 5:
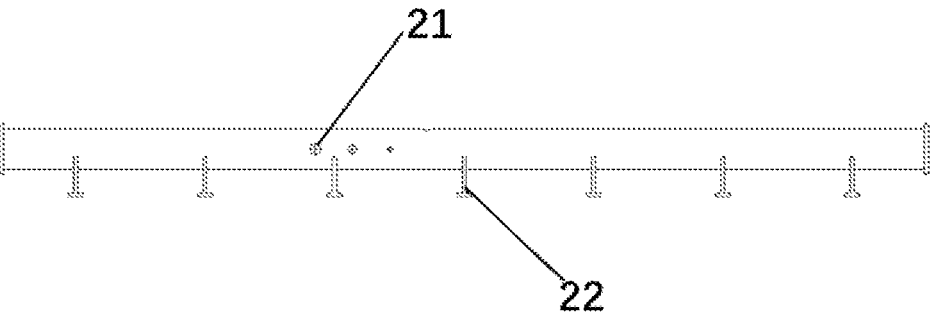
FIG. 5 is a schematic structural diagram of a stainless steel pipeline in the model box.

With reference to FIG. 4 and FIG. 5, the stainless steel pipeline 16 is arranged on an inner side of the organic glass observation window 7 through a steel structure pipeline support frame 22; a set of pipeline support frames 22 are provided, all have an inverted T-shaped structure, and are respectively attached to an inner wall of the organic glass observation window 7 by sticking a waterproof tape; and the stainless steel pipeline 16 is fixed on the box body at positions close to an inlet and an outlet of the sand box through clamping hoops 28, and the pipeline support frame 22 is closely attached to the organic glass observation window 7 to facilitate observation. A set of stainless steel pipeline threaded drilling holes 21 with different sizes and directions are reserved in the stainless steel pipeline 16 and sealed by corresponding bolts. In a simulation experiment, the pipeline seepage is simulated by opening a correspond-ing threaded drilling hole.

Figure 6:
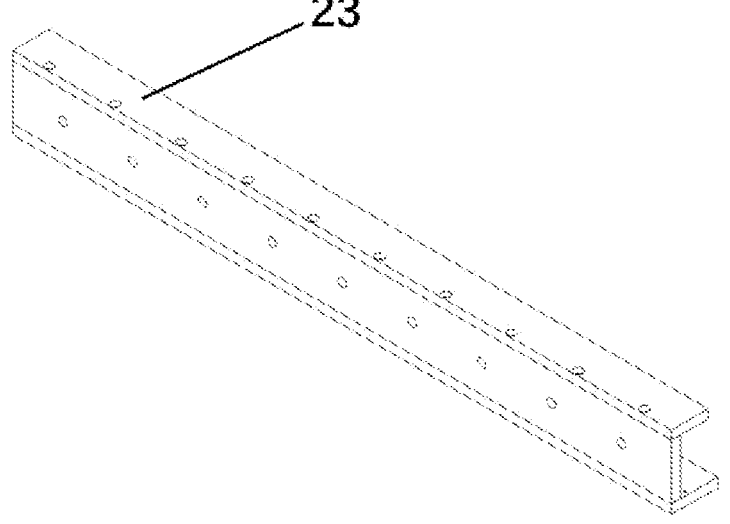
FIG. 6 is a schematic diagram of a stereoscopic structure of an organic glass structural member in the model box.
Figure 7:
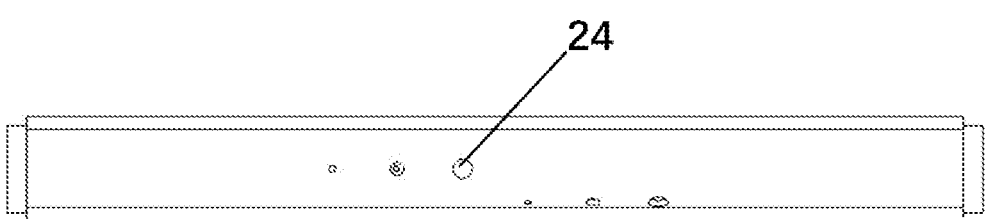
FIG. 7 is a schematic structural diagram of an organic glass pipeline in the model box.

With reference to FIG. 4, FIG. 6 and FIG. 7, the organic glass pipeline 18 is fixed on an inner side of the organic glass observation window 7 through a concave organic glass structural member 23; and a notch of the organic glass structural member 23 is inward, and a face portion of the organic glass structural member is attached to the inner wall of the organic glass observation window 7 through a glass cement to facilitate observation. The organic glass pipeline 18 is fixed in the organic glass structural member 23 through AB glue, connected with external pipelines at positions close to an inlet and an outlet of the sand box through gold wire hoses 30, and fixed in the interior of the box body at the wire gold hoses 30 through clamping hoops 28, so that the organic glass structural member 23 is closely attached to the organic glass observation window 7; and a set of organic glass pipeline threaded holes 24 with different sizes and directions are reserved in the organic glass pipeline 18, and sealed by corresponding bolts. Similarly, in the simulation experiment, the pipeline seepage is simulated by opening a corresponding threaded drilling hole.

According to the model box of the present invention, the internal seepage and external seepage working conditions may be controlled by adjusting the pipeline. In the embodiment, the actual working condition on site is simulated, and the internal and external seepage working conditions coexist at the moment. The stainless steel pipeline 16 is selected as an external seepage pipeline, and the organic glass pipeline 18 is selected as an internal seepage pipeline. The stainless steel pipeline threaded drilling hole 21 is unscrewed at a specific position on the stainless steel pipeline 16 to inject water with a large enough flow rate to form a full pipe state into the stainless steel pipeline 16. At the moment, the water in the pipeline may impact sand in the interior of the box body through the stainless steel pipeline threaded drilling hole 21 to form external seepage channel and cavity. As time goes by, the cavity is gradually expanded to form collapse on a surface of the sand. One organic glass pipeline threaded drilling hole 24 is also opened at a symmetrical position of the organic glass pipeline 18 to inject water with a relatively small flow rate to form a semi-pipe state into the organic glass pipeline 18. At the moment, a water-sand mixture inside the pipeline may be injected into the pipeline along the organic glass pipeline threaded drilling hole 24, and washed away along the pipeline to form internal seepage channel and a cavity. As time goes by, the cavity is gradually expanded to form collapse on a surface of the sand. When a seepage working condition in the box body needs to be changed, it is only necessary to change a flow rate in a corresponding pipe, and opening or closing the threaded hole.

As shown in FIG. 1, the steel structure box body is formed by welding a box body external profile steel frame 4, a multi-layer profile steel frame plate 6, a bottom steel frame 8 and a stainless steel bottom plate 31 with each other; the box body external profile steel frame 4 and the bottom steel frame 8 are fixed by welding to form a box body frame; the multi-layer profile steel frame plates 6 are enclosed to form peripheral side surfaces of the box body; and the stainless steel bottom plate 31 is welded on the bottom steel frame 8 to form a bottom surface of the box body.

Peripheral side surfaces of the steel structure box body are welded with box body fixing brackets 17, and the box body fixing brackets 17 are fixed on a cement platform through expansion screws 20.

The organic glass observation windows 7 are mounted on two sides of long edges of the box body through glass pressing assemblies 15; the glass pressing assembly 15 is connected to the box body external profile steel frame 4 through a bolt 19, and a waterproof tape is stuck between the organic glass observation window 7 and the glass pressing assembly 15; and the organic glass observation windows 7 on two sides of the box body are painted with 1 cm×1 cm grids by a mark pen.

With reference to FIG. 1, the rainfall structure bracket 1 comprises a top slide rail 3 and a rainfall bracket 2; the top slide rails 3 are mounted on two sides of a top portion of the box body through bolts, and two ends of the rainfall bracket 2 are movably mounted on the top slide rails 3 and capable of sliding back and forth along the top slide rails 3; and an upper portion of the rainfall bracket 2 is provided with a set of perforated nylon pipelines, the perforated nylon pipelines are connected with an external water pump through corresponding water pipes, water is conveyed into the perforated nylon pipelines through the water pump to simulate rainfall, and a position can be adjusted by sliding the rainfall bracket 2.

Figure 8:
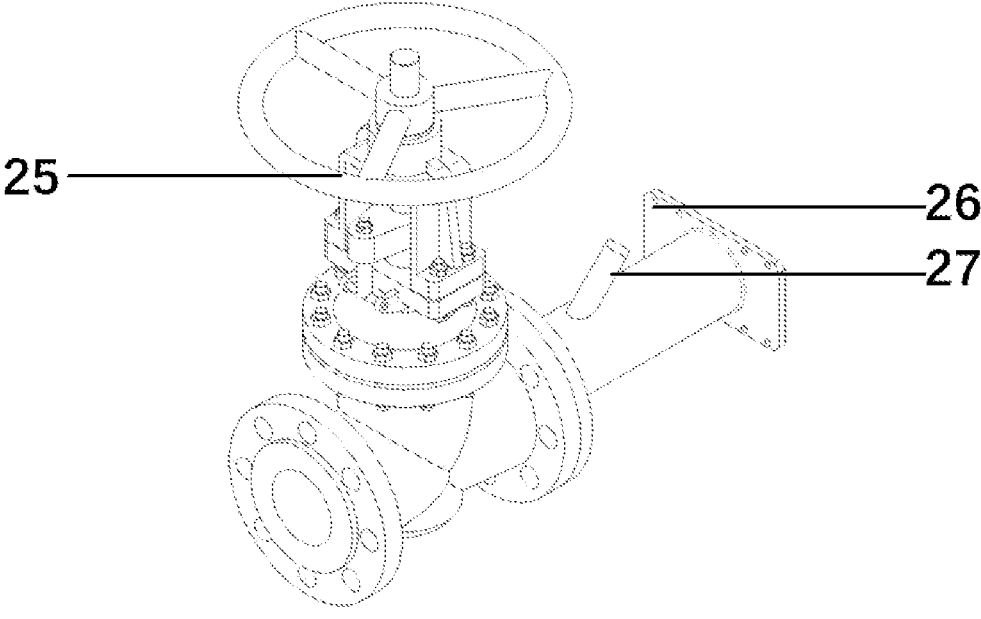
FIG. 8 is a schematic structural diagram of a sand discharging pipeline.

As shown in FIG. 8, the sand discharging pipelines 9 are fixed at bottom portions of two sides of long edges of the box body by inserting fixing bolts through mounting steel plates 26; and an upper portion of the sand discharging pipeline 9 is welded with an inclined sand washing pipe 27, a pipe orifice of the sand discharging pipeline 9 uses a gate valve 25 as a control switch, and a sand discharging and water guiding tank 10 is assembled below the sand discharging pipeline. When the interior of the box body needs to be cleaned after the experiment is finished, the sand washing may be slow by the original gate valve 25. At the moment, the gate valve 25 needs to be disassembled, and the sand is directly cleaned and discharged through the sand discharging and water guiding tank 10.

Figure 3:
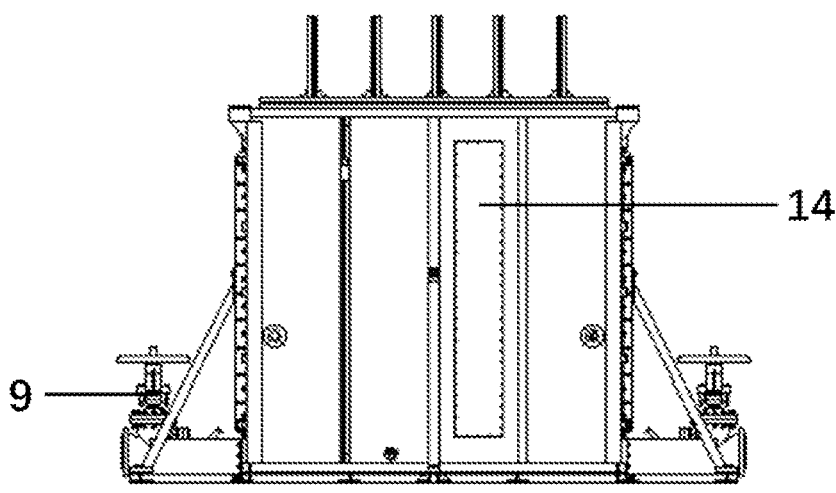
FIG. 3 is a side view of the model box.

With reference to FIG. 1 and FIG. 3, the steel plate barriers between the water tanks on two sides and the sand tank in the middle portion are provided with the water permeable holes, and the water permeable hole is filled with a water permeable stone 5 to simulate an actual environment of the buried pipeline. A water tank organic glass plate 14 is mounted on an outer wall steel plate of the water tank to facilitate observation.

The present invention provides the idea and method of the model box for leakage and collapse of the buried pipeline capable of switching internal and external seepage working conditions. There are many methods and ways to realize the technical solution specifically, and the above are only the preferred embodiments of the present invention. It should be pointed out that, for those of ordinary skills in the art, several improvements and decorations may be made without departing from the principle of the present invention, and these improvements and decorations should also be regarded as falling within the scope of protection of the present invention. All the unspecified components in the embodiments can be realized by the prior art.

What is claimed is:

1. A model box for leakage and collapse of a buried pipeline capable of switching internal and external seepage working conditions, comprising a steel structure box body, an organic glass observation window (7), a stainless steel pipeline (16), an organic glass pipeline (18) and a sand discharging pipeline (9), wherein, a top portion of the box body is opened and provided with a rainfall structure bracket (1);

and two sides of an interior of the box body are divided into water tanks on two sides and a sand tank in a middle portion through steel plate barriers, and the steel plate barrier is provided with a water permeable hole;

the organic glass observation windows (7) are arranged on two sides of long edges of the box body; the stainless steel pipeline (16) and the organic glass pipeline (18) are respectively mounted on inner sides of the organic glass observation windows (7) on two sides, and located in the sand tank; and the stainless steel pipeline (16) and the organic glass pipeline (18) are respectively reserved with a threaded drilling hole for simulating pipeline seepage; and a pair of sand discharging pipelines (9) are provided and respectively arranged at bottom portions of two sides of long edges of the box body;

further comprising a water tank water level control system (11), wherein the water tank water level control systems (11) are arranged on the water tanks on two sides of short edges of the box body, and the water tank water level control system comprises a drainage drilling hole (29), a side surface slide rail (12), a profile steel clamping seat (13) and a hose; the drainage drilling hole (29) is arranged at a bottom portion of an outer wall of the water tank; the side surface slide rail (12) is longitudinally arranged on the outer wall of the water tank; the profile steel clamping seat (13) is slidably mounted on the side surface slide rail (12) and capable of sliding up and down along the side surface slide rail (12) to adjust a height; and one end of the hose is connected to the drainage drilling hole (29), and the other end of the hose is fixed on the profile steel clamping seat (13);

wherein the sand discharging pipelines (9) are fixed at bottom portions of two sides of long edges of the box body by inserting fixing bolts through mounting steel plates (26); and an upper portion of the sand discharging pipeline (9) is welded with an inclined sand washing pipe (27), a pipe orifice of the sand discharging pipeline (9) uses a gate valve (25) as a control switch, and a sand discharging and water guiding tank (10) is assembled below the sand discharging pipeline;

wherein the steel plate barriers between the water tanks on two sides and the sand tank in the middle portion are provided with the water permeable holes, and the water permeable hole is filled with a water permeable stone (5); and a water tank organic glass plate (14) is mounted on an outer wall steel plate of the water tank.

2. The model box for leakage and collapse of the buried pipeline capable of switching internal and external seepage working conditions according to claim 1, wherein the stainless steel pipeline (16) is arranged on an inner side of the organic glass observation window (7) through a steel structure pipeline support frame (22); a set of pipeline support frames (22) are provided, all have an inverted T-shaped structure, and are respectively attached to an inner wall of the organic glass observation window (7) by sticking a waterproof tape; the stainless steel pipeline (16) is fixed on the box body at positions close to an inlet and an outlet of the sand box through clamping hoops (28), and the pipeline support frame (22) is closely attached to the organic glass observation window (7); and a set of stainless steel pipeline threaded drilling holes (21) with different sizes and directions are reserved in the stainless steel pipeline (16) and sealed by corresponding bolts.

3. The model box for leakage and collapse of the buried pipeline capable of switching internal and external seepage working conditions according to claim 1, wherein the organic glass pipeline (18) is fixed on an inner side of the organic glass observation window (7) through a concave organic glass structural member (23); a notch of the organic glass structural member (23) is inward, and a face portion of the organic glass structural member is attached to the inner wall of the organic glass observation window (7) through a glass cement; the organic glass pipeline (18) is fixed in the organic glass structural member (23) through AB glue, connected with external pipelines at positions close to an inlet and an outlet of the sand box through gold wire hoses (30), and fixed in the interior of the box body at the wire gold hoses (30) through clamping hoops (28), so that the organic glass structural member (23) is closely attached to the organic glass observation window (7); and a set of organic glass pipeline threaded holes (24) with different sizes and directions are reserved in the organic glass pipeline (18), and sealed by corresponding bolts.

4. The model box for leakage and collapse of the buried pipeline capable of switching internal and external seepage working conditions according to claim 1, wherein the steel structure box body is formed by welding a box body external profile steel frame (4), a multi-layer profile steel frame plate (6), a bottom steel frame (8) and a stainless steel bottom plate (31) with each other; the box body external profile steel frame (4) and the bottom steel frame (8) are fixed by welding to form a box body frame; the multi-layer profile steel frame plates (6) are enclosed to form peripheral side surfaces of the box body; and the stainless steel bottom plate (31) is welded on the bottom steel frame (8) to form a bottom surface of the box body.

5. The model box for leakage and collapse of the buried pipeline capable of switching internal and external seepage working conditions according to claim 4, wherein the organic glass observation windows (7) are mounted on two sides of long edges of the box body through glass pressing assemblies (15); the glass pressing assembly (15) is connected to the box body external profile steel frame (4) through a bolt (19), and a waterproof tape is stuck between the organic glass observation window (7) and the glass pressing assembly (15); and the organic glass observation windows (7) on two sides of the box body are painted with 1 cm×1 cm grids.

6. The model box for leakage and collapse of the buried pipeline capable of switching internal and external seepage working conditions according to claim 1, wherein peripheral side surfaces of the steel structure box body are welded with box body fixing brackets (17), and the box body fixing brackets (17) are fixed on a cement platform through expansion screws (20).

7. The model box for leakage and collapse of the buried pipeline capable of switching internal and external seepage working conditions according to claim 1, wherein the rainfall structure bracket (1) comprises a top slide rail (3) and a rainfall bracket (2); the top slide rails (3) are mounted on two sides of a top portion of the box body through bolts, and two ends of the rainfall bracket (2) are movably mounted on the top slide rails (3) and capable of sliding back and forth along the top slide rails (3); and an upper portion of the rainfall bracket (2) is provided with a set of perforated nylon pipelines, the perforated nylon pipelines are connected with an external water pump through corresponding water pipes, and water is conveyed into the perforated nylon pipelines through the water pump to simulate rainfall.

* * * * *